United States Patent
Stevenson et al.

(10) Patent No.: US 7,238,911 B2
(45) Date of Patent: Jul. 3, 2007

(54) RESISTANCE WELDING TIP WITH IMPROVED COOLING SYSTEM

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/997,456

(22) Filed: Nov. 24, 2004

(65) Prior Publication Data

US 2006/0108329 A1 May 25, 2006

(51) Int. Cl.
*B23K 9/24* (2006.01)
*B23K 11/30* (2006.01)
*B23K 3/03* (2006.01)
*B23K 37/02* (2006.01)

(52) U.S. Cl. .................................. 219/120; 219/86.31
(58) Field of Classification Search ................ 219/120, 219/86.31
See application file for complete search history.

(56) References Cited

U.S. PATENT DOCUMENTS 2,583,575 A * 1/1952 Casson ...................... 219/120
3,399,289 A * 8/1968 Sciaky ....................... 219/86.7
4,393,298 A * 7/1983 Frantzreb, Sr. ........ 219/137.62
4,958,056 A * 9/1990 Tomac ........................ 219/120

OTHER PUBLICATIONS

Hallum, Diane L., Pick the Right Spot-Welding Electrode, Forming and Fabricating, Jun. 2000, vol. 7 No. 6.
Hirsch, Roger B., Influence of Water Temperature and Flow On Electrode Life, Unitrol Electronics Inc Oct. 29, 2003.
Yeung, K. S., Transient Thermal Analysis of Spot Welding Electrodes, The Welding Journal Jan. 1999.

* cited by examiner

*Primary Examiner*—Jonathan Johnson
*Assistant Examiner*—Rachel E. Beveridge
(74) *Attorney, Agent, or Firm*—Kathryn A. Marra

(57) ABSTRACT

An improved cooling system for adapting to a two-component welding electrode device having a shank and cap, includes a retractable nozzle tube, a manifold, and an adjustment element for adjustably interconnecting the tube and manifold. A threaded bushing or plunger is attached to the tube and operable to adjust the distance between the interior surface of the cap and the outlet of the tube to a preferred distance. A threaded sleeve interconnects the tube and bushing for additional adjustability. The tube defines an elastically compressible bellows section, and a spacer is removably attached to the distal end of the tube for automatic adjustment of the outlet position by the cap.

18 Claims, 4 Drawing Sheets

RESISTANCE WELDING TIP WITH IMPROVED COOLING SYSTEM

BACKGROUND OF THE INVENTION

1. Field of the Invention

The present invention relates to resistance welding devices, and more particularly to a two-component electrode device having an improved cooling configuration.

2. Discussion of Prior Art

Two-component electrode welding devices are used in various industrial applications, including automotive assembly. These devices typically include a conductive shank removably connected to a welding gun, and a conductive welding cap removably connected to the distal end of the shank. As is well known in the art, these devices function to transmit electric currents through adjacently placed subject members, so that the resistance of the subject members generates sufficient heat energy to produce a spot weld therebetween. The proximity of the welding cap to the source of heat results in the transfer of significant amounts of heat energy to the cap. This resultant heat absorption and excess cap temperatures causes premature deformation and failure. Another resultant from the over-heating of caps is the tendency of the cap to "pick-up" material from, or stick to, the subject members. This tendency further causes the cap to change its configuration and reduces its efficiency. Yet another concern associated with over heated welding caps is the generation of reduced weld nugget diameters and joint tensile strengths.

Conventional cooling systems have been developed to counteract these concerns by increasing the rate of heat energy loss of the cap and, thereby, retarding or reducing the maximum achievable temperature. One type of conventional system typically includes a coolant source, and a nozzle tube that is coaxially aligned with a distribution manifold within the shank. The tube is maintained in a fixed position relative to the electrode, so that the outlet of the tube is spaced from the cap. The source and tube are cooperatively configured to direct a quantity of coolant towards the underside of the cap. The efficiency of the system is partly based on the distance between the cap and outlet. Where this distance is not properly set, inefficiency concerns arise and, at worst, the cooling system is rendered ineffective. To cure improper distancing or placement, the system must be dismantled from the welding device and repositioned, which results in an inconvenience to the worker and costly down time to the entire process.

Accordingly, there is a need in the art for an improved cooling system that more efficiently reduces the temperature of a heated welding device by facilitating the proper placement and repositioning of the nozzle tube.

BRIEF SUMMARY OF THE INVENTION

Responsive to these and other concerns caused by conventional cooling systems, the present invention concerns an improved cooling system for increasing the temperature decay rate of a heated welding cap. Among other things, the invention provided hereof, is useful for increasing the effectiveness and durability of a welding cap, and for reducing down time associated with the repositioning of conventional cooling systems.

A simple measure of the cooling efficiency of any system is the rate at which the temperature of a body, initially at elevated temperature, decreases over time under the influence of the cooling system. This measure will hereafter be described as the temperature decay rate. A first aspect of the present invention concerns an apparatus for increasing the temperature decay rate of a heated welding device. The apparatus comprises a cooling system thermally coupled to at least a portion of the device, and a holding element configured to connect at least a portion of the cooling system to the device, and hold the at least portion of the cooling system in a fixed position relative to the device. The cooling and holding elements are cooperatively configured so as to enable the adjustment of the portion of the cooling system to a second fixed position without disconnecting the at least portion of the cooling system from the device.

A second aspect of the present invention concerns an apparatus for increasing the temperature decay rate of a heated welding cap. The cap presents an interior surface, and is removably interconnected to a tubular shank so as to space the interior surface from the shank. The apparatus comprises a quantity of coolant, a manifold fixed relative to the shank and cap, a nozzle tube defining an outlet, and an adjustment element adjustably interconnecting the manifold and tube, so that the location of the outlet is adjustable to one of a plurality of fixable positions, without disconnecting the manifold and tube. The manifold, tube and element are cooperatively configured to space the outlet a preferred distance from and direct the coolant towards the interior surface of the cap.

A third aspect of the present invention concerns a distribution manifold adapted for use with an adjustable cooling system having a coolant supply tube. The manifold presents a tubular body defining an interior wall surface and an adjustment element cooperatively configured to adjustably interconnect the manifold and tube.

A fourth aspect of the present invention concerns a method for increasing the temperature decay rate of a welding device having a structural component and a first engaging component removably attached to the structural component. The method comprises the steps of adjustably connecting a cooling system including a supply tube defining an outlet to the structural component, fixing the outlet in a first position, so that the system is configured to withdraw heat energy from the first engaging component at a first rate, and adjusting the outlet to a second configuration, so as to increase the rate, without disconnecting the system from the structural component.

It will be understood and appreciated that the present invention provides a number of advantages over the prior art, including, for example, providing an adjustable connection to the welding device that facilitates the proper placement of the cooling system. Using an adjustable connection also reduces down time and costs associated with dismantling and repositioning conventional cooling systems.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment of the invention is described in detail below with reference to the attached drawing figures, wherein.

DETAILED DESCRIPTION OF THE INVENTION

The present invention concerns an improved cooling system 10 for adjustably adapting to a two-component spot-welding electrode device 12. The cooling system 10 is thermally coupled to the welding device 12, i.e. when operative it is able to effect a greater than 5% change in the temperature decay rate of at least a portion of the device 12 in comparison to passive approaches. It should initially be noted, however, that the improved cooling system 10, is not limited in use to the welding device shown and described herein, and can be utilized with other suitable configurations.

Figure 1:
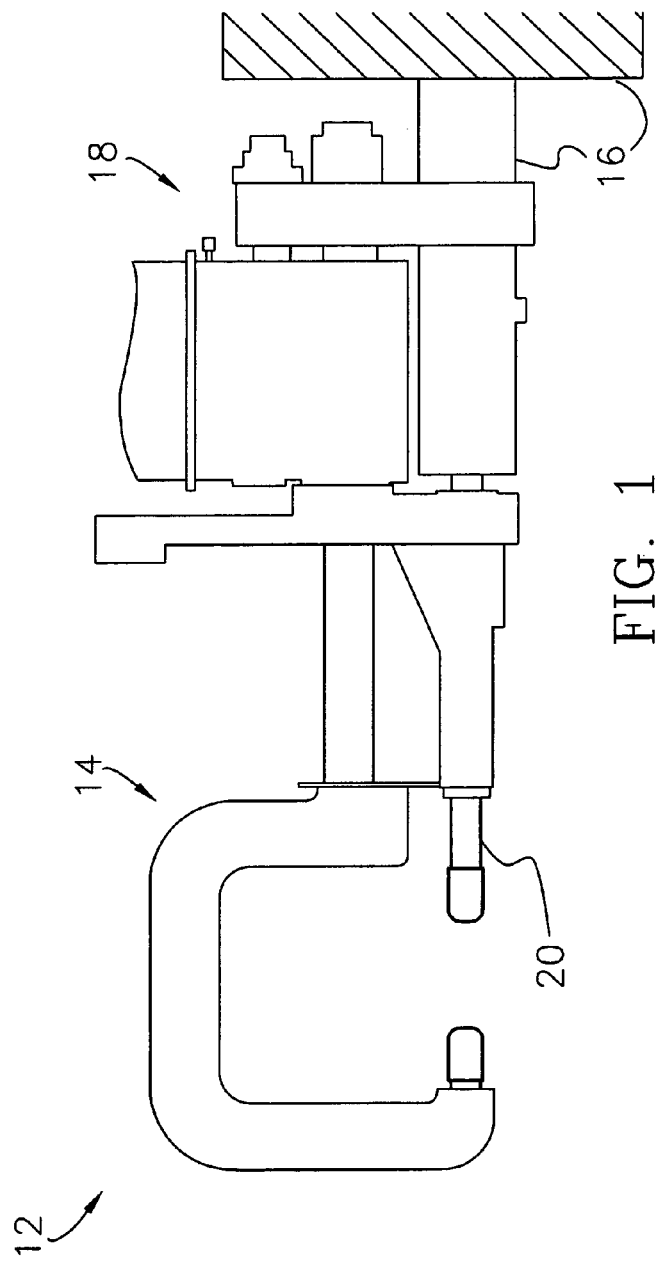
FIG. 1 is an elevational view of a conventional welding device.

As shown in FIG. 1, the welding device 12 typically includes a welding gun 14, a structural base 16, electrical and mechanical apparatus 18 for maneuvering the gun 14 to a desired location, and at least one electrode 20 removably attached to the gun 14. Shown in FIG. 1 is a press weld system having upper and lower electrodes. The upper and lower electrodes are identical in structure and function, and therefore only upper electrode 20 is described in detail herein. As is typical, the welding device 12 functions to produce a spot-weld 22 between two separate members, and more preferably between two planar sheets 24,26 of material, such as steel, stainless steel or aluminum. For example, in an automotive setting, the device 12 can be used to weld together multiple body panels such as floor pans, deck lids, hoods, doors, and engine compartments. Suitable sheets 24,26 are determined based in part on the melting range, thermal conductivity, and electrical resistance of the material and the electrical capacity of the gun 14. Examples of suitable welding guns for use with the present invention are the GEM robotic welding gun X Type Mods. G01-3, manufactured by GEM s.r.l. of Torino, Italy.

Figure 2:
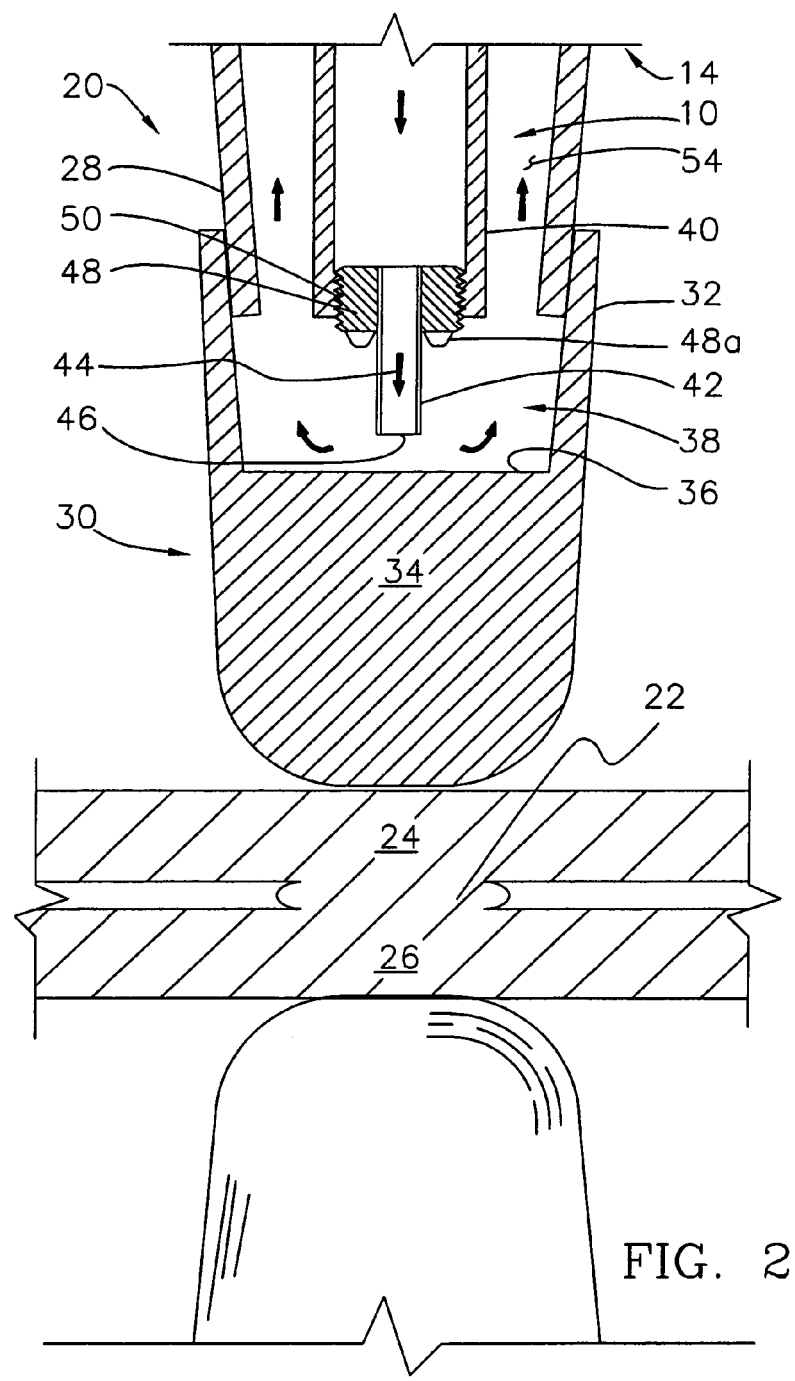
FIG. 2 is a cross-sectional fragmentary view of a two-component electrode, two subject members welded together, and the adjustment element of a cooling system in accordance with a first preferred embodiment of the present invention.
Figure 3B:
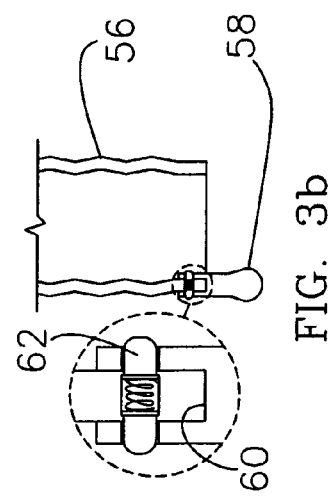
FIG. 3b is an enlarged cross-sectional fragmentary view of the bellows section in a lesser-compressed condition, and a rounded spacer removably connected to the tube.
Figure 3A:
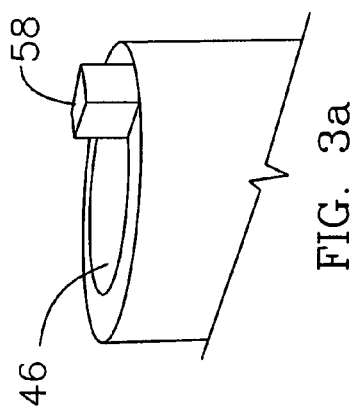
FIG. 3a is an enlarged fragmentary perspective view of the outlet of the tube and spacer shown in FIG. 3.
Figure 3:
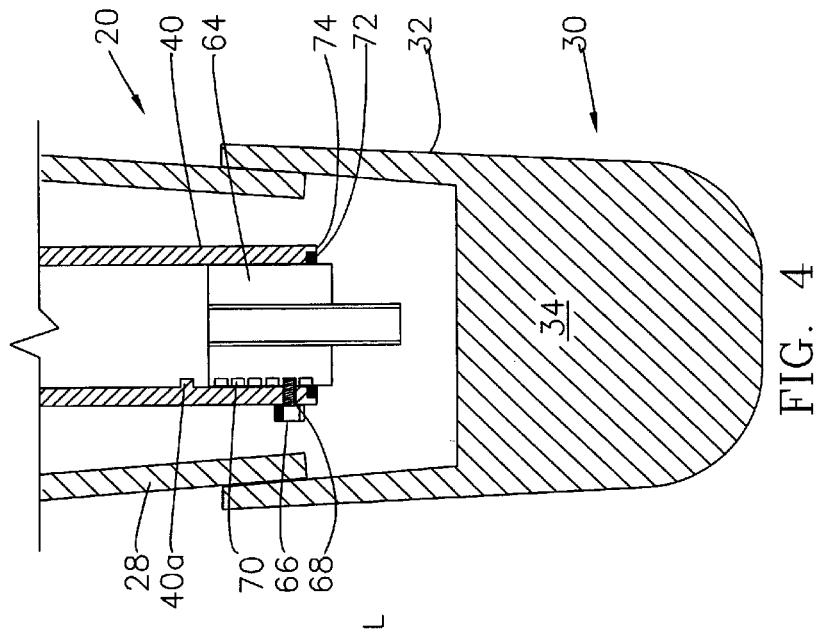
FIG. 3 is a cross-sectional fragmentary view of the electrode, and the cooling system in accordance with a third preferred embodiment of the present invention.
Figure 4:
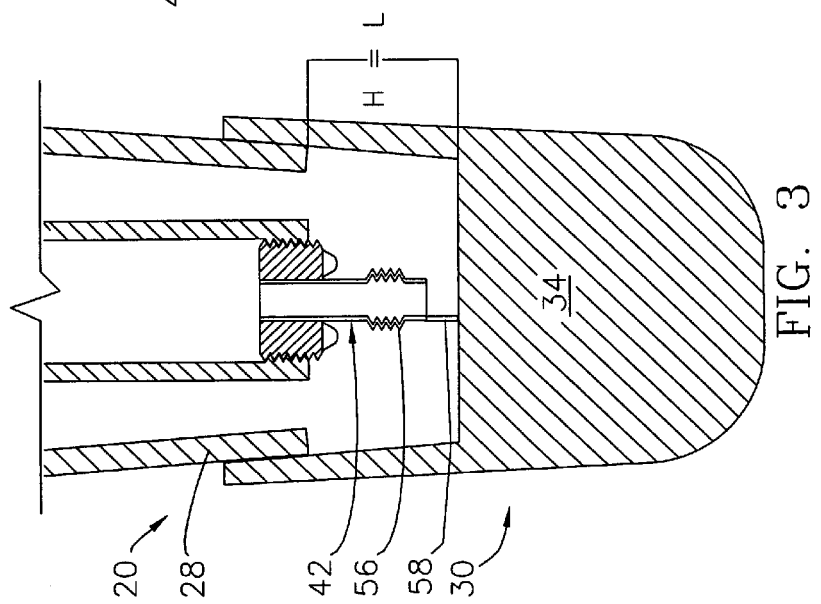
FIG. 4 is a cross-sectional fragmentary view of the electrode, and cooling system in accordance with a fourth preferred embodiment of the present invention.

As best shown in FIGS. 2–4, the preferred electrode 20 includes a shank 28 removably attached to the gun 14, and a welding cap 30 removably attached to the distal end of the shank 28. Thus, the preferred electrode 20 presents a two-component electrode. The preferred cap 30 presents a female configuration, so that the shank 28 is slidably insertable therein. However, a male cap configuration may also be utilized. The non-equivalent tapers of the shank 28 and cap 30 result in the primarily elastic deformation of the shank 28, which applies a holding force to the cap 30.

As is typical, the cap 30 consists of a tubular skirt portion 32 opened at one end, and a solid head portion 34 opposite the open end of the skirt portion 32. The interface of the skirt and head portions 32,34 forms an exposed interior surface 36. The head portion 34 presents one of a plurality of geometric shapes at the distal end opposite the interior surface 36 to promote contact with the adjacent member 24 based on the orientation of the electrode 20. For example, the cap 30 may present a flat, domed, offset, truncated or otherwise irregular contact configuration. The skirt portion 32 is typically configured to space the interior surface 36 approximately 4 mm from the shank 28.

The shank 28 typically presents a tubular configuration for attachment to the electrode holder (not shown) of the gun 14. The shank 28 partially defines an internal cooling passage 38 that is radially defined by the shaft 28 and skirt portion 32 and generally enclosed by the cap 30 and holder. The preferred electrode 20 shown in FIGS. 1–4 presents a straight longitudinal axis and tapered wall configuration; however, spade, crank, single bend, or double bend configurations may also be utilized. Finally, the electrode 20 is formed of conductive material, such as a copper base alloy, suitable for efficiently transmitting the necessary current and transferring a forging pressure to the members.

Turning to the configuration of the improved cooling system 10, the illustrated embodiments of the present invention shows the relative distal end of a distribution manifold 40, a nozzle tube 42, a quantity of coolant 44 flowing through the manifold 40 and tube 42, and an adjusting element for adjustably interconnecting the manifold 40 and tube 42. A coolant source (not shown) is configured to cooperatively direct the coolant 44 through an outlet 46 defined by the tube 42, and the adjusting element is configured to adjust the position of the outlet 46 relative to the electrode 20. The nozzle tube 42 presents a non-tapered tubular body; and the coolant 44 may be any one or combination of conventional fluid coolants such as water, propylene glycol, or ethylene glycol.

Figures 2B, 2C:
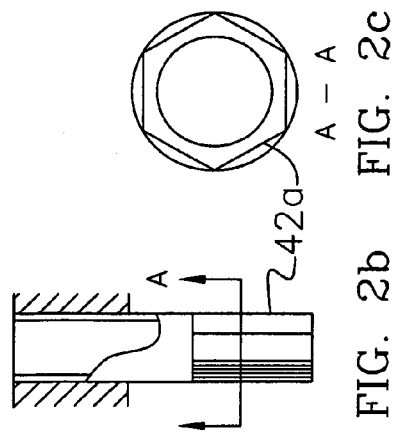
FIG. 2b is a partial fragmentary view of the nozzle tube, particularly illustrating the hexagonal distal portion.
FIG. 2c is a cross-sectional view of the hexagonal distal portion of the nozzle tube.
Figure 2A:
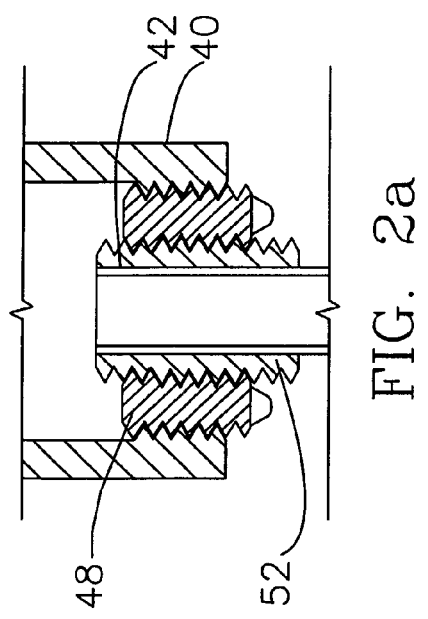
FIG. 2a is a cross-sectional fragmentary view of the adjustment element in accordance with a second preferred embodiment of the present invention, particularly illustrating a threaded sleeve and bushing combination.

As shown in FIG. 2, a preferred embodiment of the adjusting element includes a bushing 48. The preferred bushing 48 is threadably attached to a threaded interior portion 50 of the manifold 40 and coupled to the tube 42, so as to convert relative rotation between the manifold 40 and bushing 48 into the linear migration of the outlet 46. More preferably, the bushing 48 interconnects the threaded interior portion 50 of the manifold and a threaded sleeve 52 fixed to the tube 42, so as to provide separate adjustment means, as shown in FIG. 2a. In both configurations, static friction between the bushing 48, sleeve 52, and manifold 40 is preferably sufficient to retain the tube 42 in a fixed position during operation. It will be appreciated that the relative locations and relative dimensions of the cap and manifold may differ from that shown, particularly for some of the other shank geometries cited previously where geometric constraints may require that the manifold be recessed deeper within the shank. However, the operational details described subsequently are unaffected.

To facilitate manual adjustment, the distal end of the manifold 40, bushing 48 and/or sleeve 52 are preferably positioned adjacent the cap end of the shank 28 making them accessible to an operator when the cap 30 is detached. The tube 42 preferably presents a distal portion 42a having a hexagonal cross-sectional shape, as shown in FIGS. 2b and 2c, so as to enable conventional wrench adjustment. More preferably, at least one planar handle 48a can axially project from the bushing 48 (see FIG. 2) or a hexagonal bushing head (not shown) can be provided adjacent the tube end of the bushing 48.

Also shown in FIG. 2, the coolant 44 is directed towards the interior surface 36, i.e. underside, of the cap, and more preferably deflects from the surface 36 so that the coolant 44 does not stagnate adjacent the cap 30. The coolant 44 is returnable through the internal passageway 38, and more particularly, through a coolant return portion 54 of the passageway defined by the shank 28 and manifold 40. To enable the removal of coolant and avoid pressure build-up within the system 10, the total cross-sectional surface area of the return portion 54 is equal to or greater than the cross-sectional area of the tube outlet 46.

In the preferred embodiment shown in FIG. 3, the preferred tube 42 is retractable, and the adjustment element further includes a spacer 58 attached to the tube outlet 46. More particularly, a bellows section 56 is defined by the tube 42, and cooperates with the spacer 58 to limit the minimum distance between the interior surface 36 of the cap 30 and outlet 46. Where the total height, H, of the exposed portion of the tube, i.e. tube height over shank, and spacer 58 is greater than the effective skirt length, L, i.e. the axial length of the skirt portion 32 of the cap minus the overlap with the shank 28, the spacer 58 is brought to bear against the interior surface 36 and the bellows section 56 is compressed until H equals L (see FIG. 3). Since the bellows section 56 is only elastically deformed, it will spring back when the cap is removed and the entire process can be repeated with a new cap. That is to say, the bellows section 56 provides automatic adjustment means, when a second cap presenting a length, L, greater than H is utilized.

Alternatively, at least a portion of the tube can be retracted into an axially oriented circular slot (not shown) defined by the bushing 48. In this alternate, the tube is biased towards the unretracted position preferably by a circular compression spring (also not shown) housed within the slot. The spring functionally presents a compressive strength greater than the anticipated recoil forces applied to the tube by the discharging coolant 44 and less than the hold force applied to the cap 30 by the shank 28. Where tube retractability is not desired, however, the bushing 48 and tube 42 can be integrally formed, or the tube 42 can be omitted altogether.

As best shown in FIG. 3*a*, the preferred spacer 58 is configured so as not to substantially obstruct the outlet 46, and more preferably, presents a wedge having a matching footprint to a sector of the tube wall. Alternatively, the spacer 58 is removably attachable to the tube 42, and preferably, presents a U-shaped seat 60 configured to snuggly straddle the tube wall, with extensions 62 which elastically grip the tube wall to maintain the spacer position as shown in FIG. 3*b*. Also shown in FIG. 3*b*, the spacer 58, more preferably, presents a rounded or beveled distal end so as to minimize contact with the interior surface 36 of the cap and thereby limit heat transfer due to conduction. Finally, the preferred spacer 58 is formed of suitable material capable of withstanding, without deformation and degradation, the anticipated conditions at and near the interior surface 36 of the cap, which may include temperatures in excess of 400° F. and constant interaction with flowing coolant.

In the preferred embodiment shown in FIG. 4, the adjustment element includes a plunger 64 that is telescopingly interfitted with the manifold 40, and coaxially aligned with and fixedly attached to the nozzle tube 42. The preferred plunger 64 is snuggly received by the manifold 40 so as to form a generally watertight yet slidable interface. A stop 40*a* is preferably fixed to the inside surface of the manifold 40 to prevent the plunger 64 from fully retreating into the manifold 40. The preferred plunger 64 includes a fastener 66 configured to hold the plunger 64 in fixed position relative to the manifold 40. For example, the fastener 66 can include a removable plunger screw or bolt configured to pass through a manifold hole 68 defined by the manifold 40, and one of a plurality of linearly spaced tapped bolt depressions 70 defined by the plunger 64 (see FIG. 4). Alternatively, however, the fastener 66 can simply be a compressible clip (not shown) removably fastened to both the manifold 40 and exposed portion of the plunger 64, so as to prevent relative displacement therebetween.

In each of the preferred embodiments, a conventional O-ring seal 72 preferably abuts the cap end of the manifold 40 within an O-ring seat 74 defined by the manifold 40, so as to form a seal between entering and returning coolant flow. The adjustment element enables the supply tube outlet 46 to be easily adjusted to a more effective cooling position after fixing the system 10 relative to the welding device 12. More particularly, the outlet 46 is adjusted to a position, wherein the distance between the interior surface 36 of the cap and outlet 46 is between the range of 0.25 mm to 1.25 mm, and more preferably, approximately equal to 0.5 mm. It is appreciated by those ordinarily skilled in the art that the most efficient time constant rates of temperature decay are achieved at these locations. It is further appreciated, however, that the afore-mentioned preferred distances correlate to an outlet coolant pressure of approximately 2000 mmHg (i.e. aprx. 40 psi), and that other distance-pressure combinations congruent to these ratios can be utilized with the present invention.

Thus, a method for increasing the temperature decay rate of a heated welding device having a structural component and a heated cap includes a first step of adjustably connecting a preferred embodiment of the cooling system 10 to the structural component. The tube 42 is fixed relative to the cap, so that the tube outlet 46 is located at a first position and a first temperature decay rate is achieved. After noting the size classification of the cap or measuring the effective skirt length, L, and at a second step, the bushing 48 is manually rotated so that the outlet 46 is adjusted to a second position, wherein the distance between the outlet and interior surface of the cap is approximately 0.5 mm and the rate is increased. After a plurality of welding cycles sufficient to degrade the usefulness of the cap or where a cap of different geometry is desired, and at third step, the cap is removed and replaced by a second cap. Step four repeats the procedure of the second step, and the process continues until completion of the welding cycle(s) at step five. More preferably, at the second step, the outlet 46 is automatically adjusted to the second position by contacting the interior surface of the cap with a spacer 58 attached to the tube 42 and compressing a bellows section 56 defined by the tube 42.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to assess the scope of the present invention as pertains to any apparatus not materially departing from the literal scope of the invention set forth in the following claims.

What is claimed is:

1. An adjustable apparatus for increasing the temperature decay rate of a heated welding device having first and second removably interconnected portions presenting a fixed condition, said apparatus comprising:
   a cooling system defining an outlet, having an adjustment element, and being thermally coupled to and configured to increase the temperature decay rate of the first portion of the device; and
   a holding element configured to connect the cooling system to the second portion of the device, and hold the outlet in a first fixed position relative to the first portion of the device when the first and second portions of the device are connected, so as to define a first minimum distance between the outlet and first portion of the device,
   said cooling system and holding element being cooperatively configured to allow access to the adjustment element, and enable the adjustment of the outlet to a second fixed position when the system is connected to the second portion of the device, and the first and second portions of the device are disconnected, such that the second fixed position defines a second minimum distance between the outlet and first portion of the device, upon reconnecting the first and second portions of the device to the fixed condition.

2. The apparatus as claimed in claim 1,
   said cooling system including a quantity of coolant, a manifold fixed relative to the device, and a nozzle tube adjustably connected to the manifold,
   said cooling system being configured to direct the coolant towards said first portion of the device.

3. The apparatus as claimed in claim 2,
   said cooling system further including a bushing connected to the tube and threadably coupled to the manifold.

4. The apparatus as claimed in claim 3,
   said bushing being threadably coupled to the tube, so as to present separate adjustment means.

5. The apparatus as claimed in claim 2,
   said cooling system further including a plunger connected to the tube and telescopingly coupled to the manifold, and a fastener configured to hold the plunger in a fixed position relative to the manifold.

6. The apparatus as claimed in claim 2,
   said holding and cooling systems being cooperatively configured to present a coolant pressure at the outlet approximately equal to 2000 mmHg, and space at least a portion of the outlet from said first portion of the device a distance within the range of 0.25 mm to 1.25 mm.

7. The apparatus as claimed in claim 6,
   said holding and cooling systems being cooperatively configured to space said at least portion of the outlet approximately 0.5 mm from said first portion of the device.

8. The apparatus as claimed in claim 2,
   said cooling system further including a spacer presenting a length, and longitudinally abutting the tube,
   said tube being retractable, such that said spacer and tube are cooperatively configured to contact said first portion of the device, and space the outlet from said first portion of the device a distance equal to the length of the spacer.

9. The apparatus as claimed in claim 8,
   said spacer being removably coupled to the tube,
   said tube further defining an elastically compressible bellows section.

10. The apparatus as claimed in claim 2,
    said tube presenting a distal portion having a hexagonal cross-sectional shape.

11. The apparatus as claimed in claim 1,
    said cooling system and holding element being cooperatively configured to enable the adjustment of the outlet to one of a plurality of incrementally spaced second fixed positions without disconnecting the cooling system from the device.

12. The apparatus as claimed in claim 1,
    said cooling system, holding element, and device being cooperatively configured to enable the manual adjustment of the outlet to the second fixed position without disconnecting the cooling system from the device.

13. An apparatus for increasing the temperature decay rate of a heated welding cap, wherein said cap presents an interior planar surface, and is removably interconnected to a tubular shank presenting a distal cap end, such that the interior surface is spaced from the shank near the end, said apparatus comprising:
    a coolant source;
    a quantity of coolant;
    a manifold fixed relative to the shank and cap;
    a nozzle tube defining an outlet located a first absolute position spaced from the interior planar surface; and
    an adjustment element adjustably interconnecting the manifold and tube,
    said element being housed within the interior radius of the shank and located near the end, so as to be manually accessible only when the cap and shank are disconnected, and configured to adjust the location of the outlet to another absolute position without disconnecting the manifold and tube,
    said source, manifold, tube and element being cooperatively configured to direct the coolant towards the interior planar surface of the cap, when the cap and shank are connected.

14. The apparatus as claimed in claim 13,
    said adjustment element including a bushing threadably interfitted with the manifold, so that rotational displacement of the bushing results in the linear displacement of the outlet relative to the manifold.

15. The apparatus as claimed in claim 14,
    said adjustment element further including a sleeve fixedly attached to the tube and threadably interfitted with the bushing, so as to present separate adjustment means.

16. The apparatus as claimed in claim 14,
    said bushing and tube being integrally formed.

17. The apparatus as claimed in claim 13, wherein the manifold presents a tubular member having an interior wall surface, and the adjustment element includes a threaded portion of the interior wall surface operable to receive a threaded bushing coaxially aligned therewith.

18. The apparatus as claimed in claim 13, wherein the adjustment element includes a tapped manifold hole operable to receive a plunger bolt.

* * * * *